Figure 1:
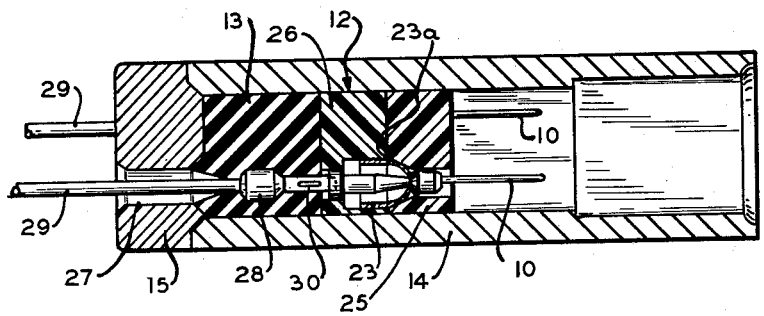

Aug. 11, 1964  R. T. GRANT  3,144,288
ELONGATED WIRE TO FLAT CABLE CONNECTOR
Filed Feb. 21, 1962  5 Sheets-Sheet 1

INVENTOR.
R. T. GRANT
BY
ATTORNEY

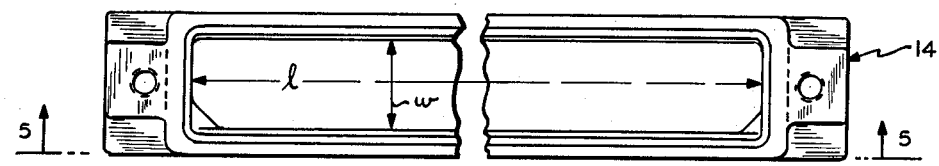
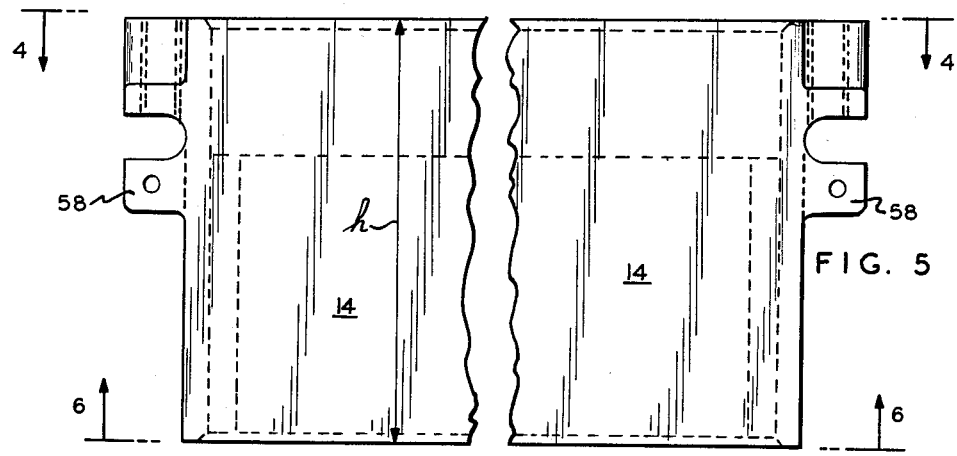
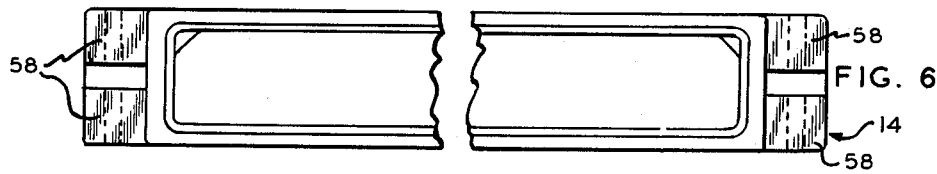
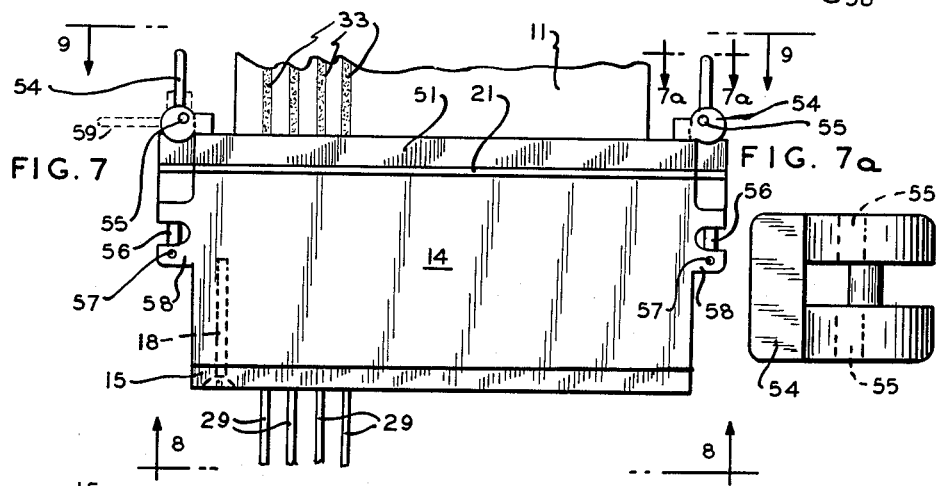
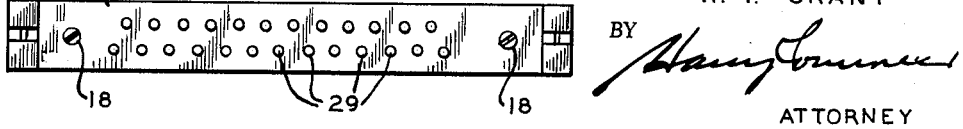

Aug. 11, 1964 R. T. GRANT 3,144,288
ELONGATED WIRE TO FLAT CABLE CONNECTOR
Filed Feb. 21, 1962 5 Sheets-Sheet 3
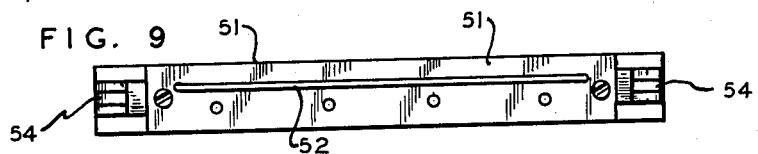
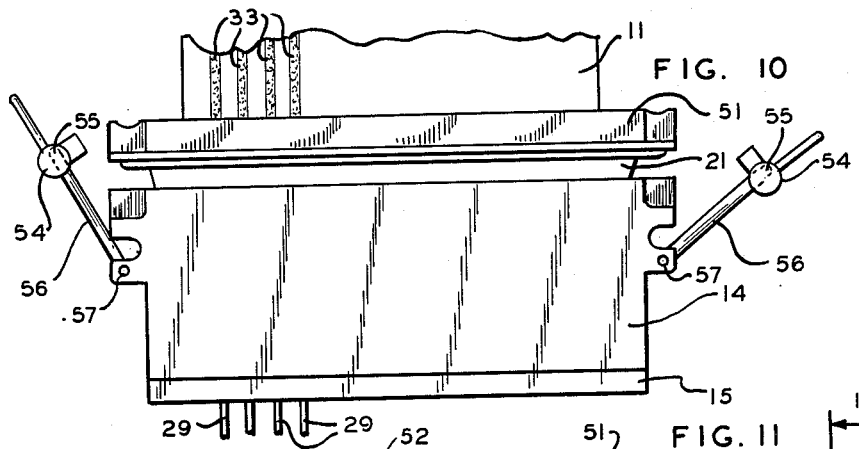
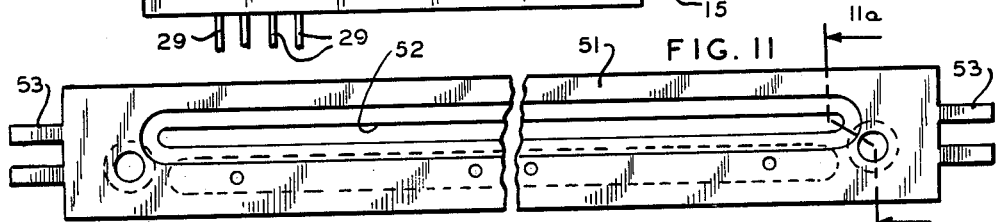
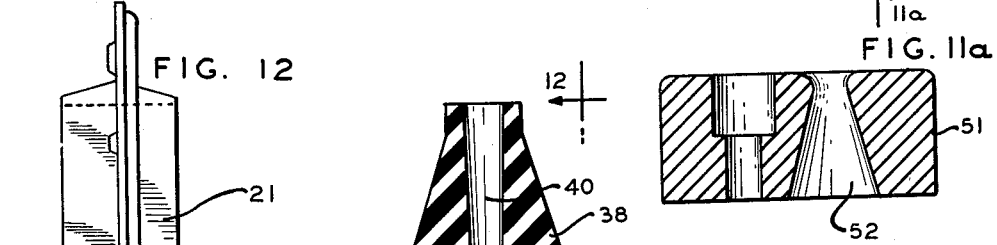
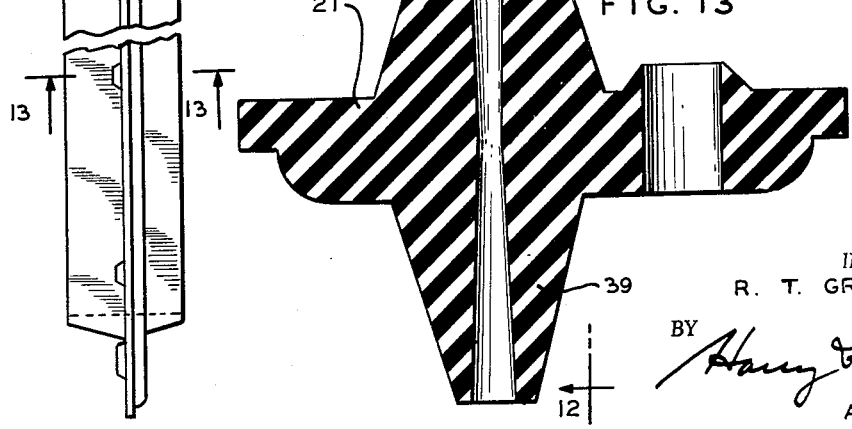
INVENTOR.
R. T. GRANT
BY
ATTORNEY

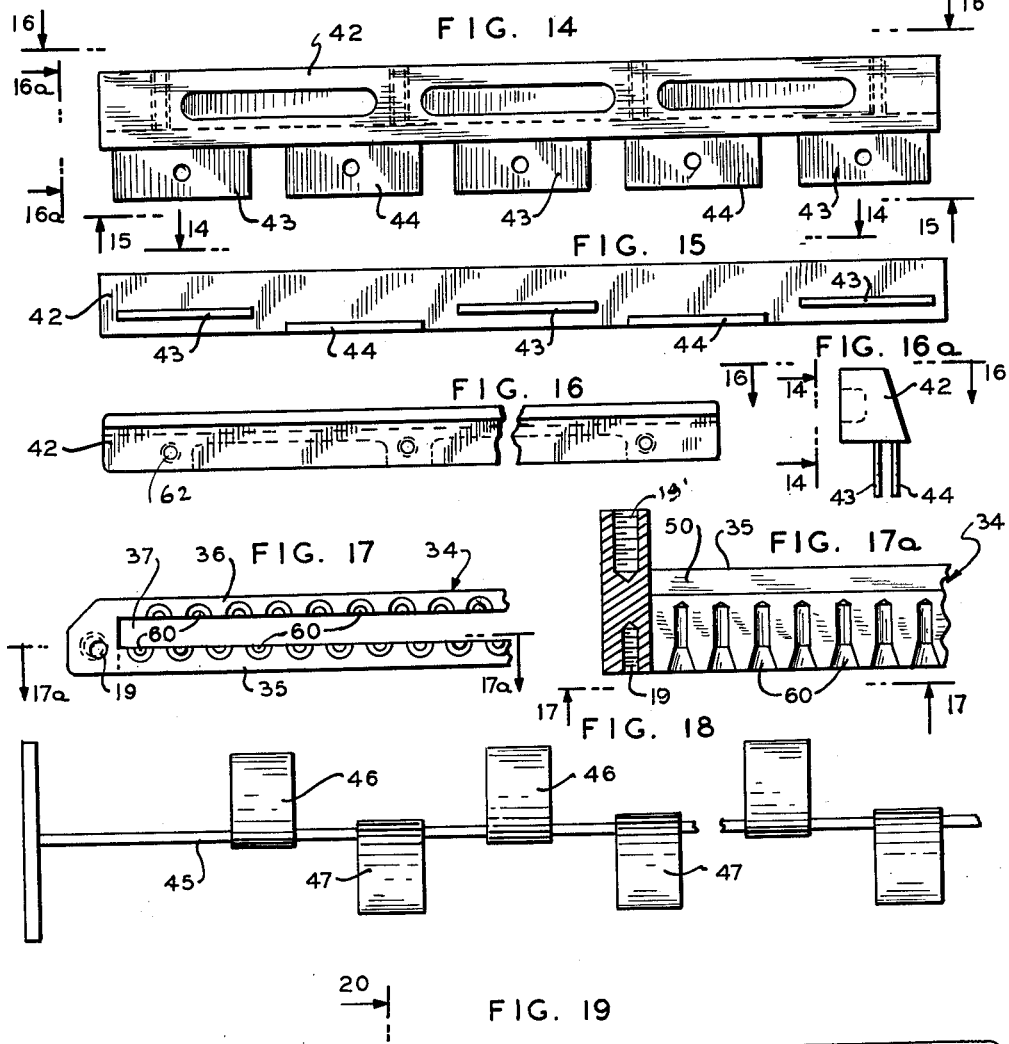

Aug. 11, 1964   R. T. GRANT   3,144,288
ELONGATED WIRE TO FLAT CABLE CONNECTOR
Filed Feb. 21, 1962   5 Sheets-Sheet 5
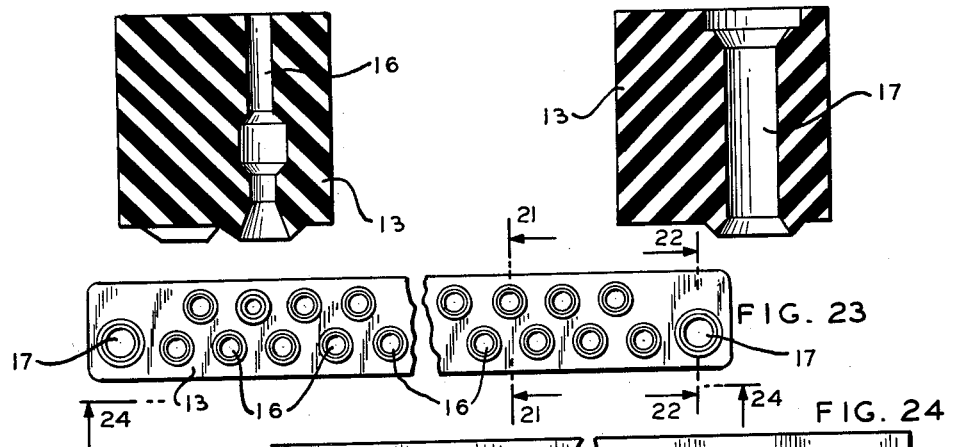
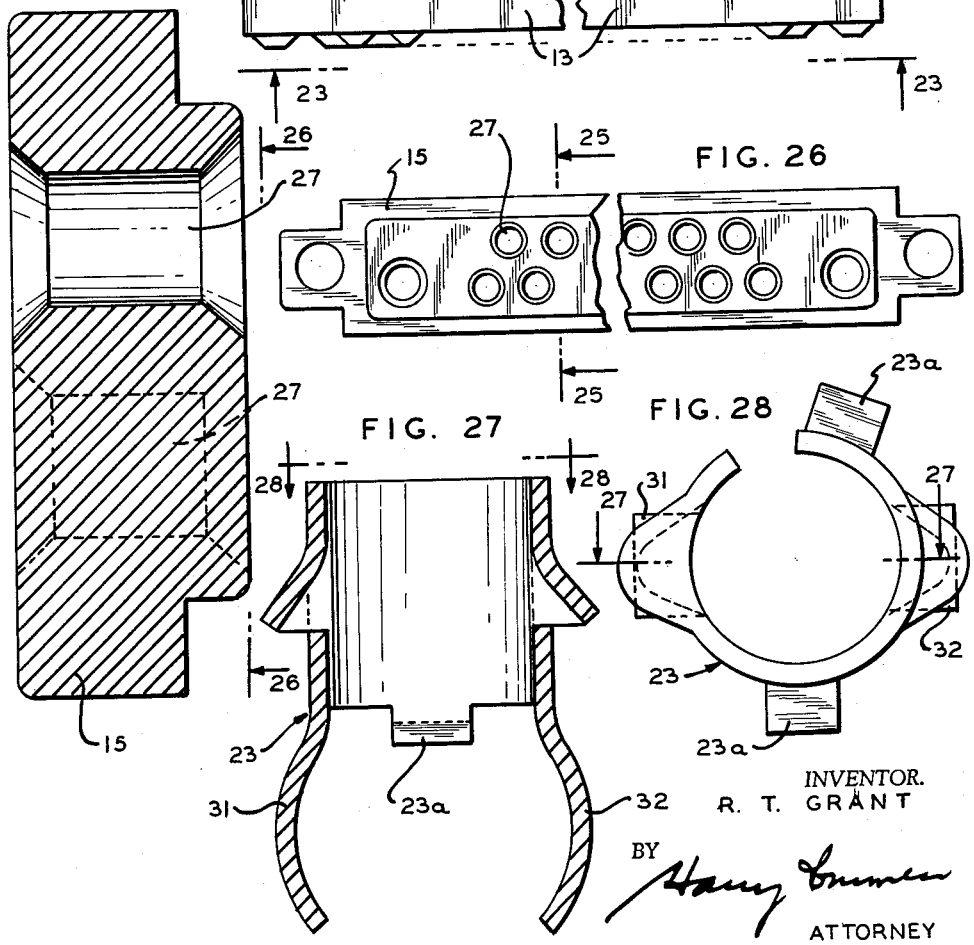
INVENTOR.
R. T. GRANT
BY Harry Grumman
ATTORNEY

United States Patent Office 3,144,288
Patented Aug. 11, 1964

3,144,288
ELONGATED WIRE TO FLAT CABLE CONNECTOR
Richard T. Grant, Clifton, N.J., assignor, by mesne assignments, to The Kent Manufacturing Co., Elizabeth, N.J., a corporation of New Jersey
Filed Feb. 21, 1962, Ser. No. 175,390
8 Claims. (Cl. 339—17)

This invention relates to a device for connection of elongated wire terminals to flat cable, having features enabling the convenient and ready assembly of terminals in line with flat cable in a casing, with novel means enabling rapid assembly and disassembly of the parts.

Pursuant to the invention, a first assembly is provided and positioned in the lower end of a casing; said first assembly may include a plurality of elongated wire terminals so disposed that various flat cable assemblies may be readily positioned over the first assembly and brought into positive engagement therewith. Flat cable members of various types may be readily secured to and disconnected from the extending ends of terminals of the first assembly and the first assembly may be readily replaced in the casing when desired.

The device further incorporates novel features of construction such that the elongated wire terminals and flat cables may be secured together in registration effectively and in a rapid and accurate fashion and held engaged for as long as desired, and then readily disassembled. The constructional features of the device are such that it is inherently durable, effective and reliable in operation and use.

The drawings, illustrating procedures and devices useful in carrying out the invention, and the description below, are exemplary only of the invention, which shall be deemed to cover all other devices and procedures coming within the scope and purview of the appended claims.

Figure 2:
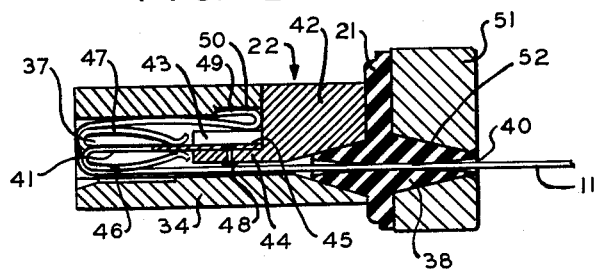
Figure 3:
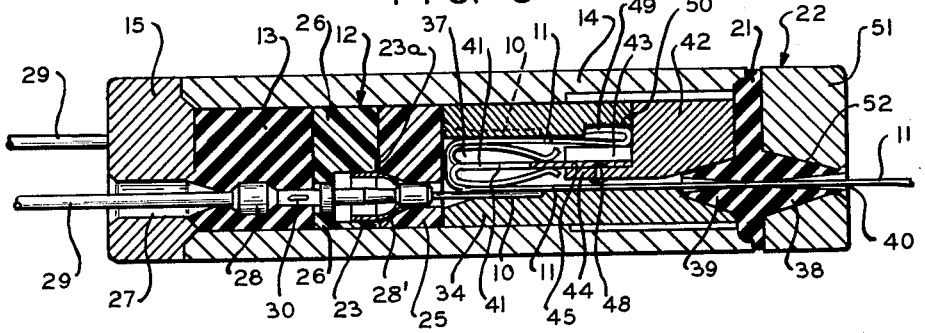

In the drawings, wherein similar reference characters indicate like parts:

FIG. 1 is a vertical sectional view of a casing embodying the invention showing a first assembly positioned therein having extending elongated wire terminals, FIG. 2 is a vertical sectional view of a second assembly, including a flat cable, prior to insertion in the casing, FIG. 3 is a vertical sectional view of the assemblies shown in FIGS. 1 and 2, joined in assembled position, FIG. 4 is a partly fragmentary, top plan view of a casing embodying the invention, taken at line 4—4 of FIG. 5, FIG. 5 is a side elevational view thereof, taken at line 5—5 of FIG. 4, FIG. 6 is a bottom plan view thereof, taken at line 6—6 of FIG. 5, FIG. 7 is a side elevational, partly fragmentary view of the casing having a flat cable and elongated wire terminals connected therein, FIG. 7a is an enlarged top plan view of one of the cam members shown in FIG. 7 for securing the gasket cover plate on the casing, taken at line 7a-7a of FIG. 7, FIG. 8 is a bottom plan view thereof, taken at line 8—8 of FIG. 7, FIG. 9 is a top plan view taken, at line 9—9 of FIG. 7, FIG. 10 is a view similar to FIG. 7 but showing the cover plate and the casing opened by loosening the cam latch, FIG. 11 is a top plan view of the gasket cover plate, FIG. 11a is an enlarged vertical transverse sectional view thereof, taken at line 11a—11a of FIG. 11, FIG. 12 is a side elevational view of the second flexible gasket plate, taken at line 12—12 of FIG. 13, FIG. 13 is an enlarged vertical secitonal view thereof, taken at line 13—13 of FIG. 12, FIG. 14 is a side elevational view of a blade for holding the cable-engaging spring in the second assembly, taken at line 14—14 of FIG. 15, FIG. 15 is a bottom plan view thereof, taken at line 15—15 of FIG. 14, FIG. 16 is a partly fragmentary top plan view thereof, taken at line 16—16 of FIG. 14, FIG. 16a is an end elevational view thereof, taken at line 16a—16a of FIG. 14, FIG. 17 is a bottom plan view of a plate disposed beneath the second flexible gasket, FIG. 17a is a fragmentary, longitudinal vertical sectional view thereof, taken at line 17a—17a of FIG. 17, FIG. 18 is a fragmentary partly broken bottom plan view of flat spring member to be secured to the blade shown in FIG. 16a as shown in FIGS. 2 and 3, FIG. 19 is a bottom plan view of a spring retaining bar of the first assembly, FIG. 20 is an enlarged fragmentary, vertical sectional view thereof, taken at line 20—20 of FIG. 19, FIG. 21 is an enlarged vertical sectional view, taken at line 21—21 of FIG. 23, of a sealing gasket for the first assembly, FIG. 22 is an enlarged vertical sectional view thereof, taken at line 22—22 of FIG. 23, FIG. 23 is a fragmentary bottom plan view of said flexible sealing gasket taken at line 23—23 of FIG. 24, FIG. 24 is a side elevational view thereof, taken at line 24—24 of FIG. 23, FIG. 25 is an enlarged vertical sectional view of the back cover, taken at line 25—25 of FIG. 26, FIG. 26 is a fragmentary bottom plan view of said back cover of the first assembly, taken at line 26—26 of FIG. 25, FIG. 27 is an enlarged vertical sectional view of a spring member in the first assembly for frictionally engaging the elongated wire terminals thereof, taken at line 27—27 of FIG. 28, and FIG. 28 is a top plan view thereof, taken at line 28—28 of FIG. 27.

As shown in the drawings (FIG. 1) the device of this invention is designed for transition connection of preferably a plurality of elongated wire terminals 10 to flat cable 11 (FIG. 2) as by positioning a first assembly 12 at the inner lower part of casing 14, the latter closed by means such as a bottom plate 15 (FIGS. 8, 1 and 3). Casing 14 is of a given length 1 and width w and height h (FIGS. 4, 5) and the various parts are dimensioned according to the use desired. The elongated wire terminals 10 pass through openings 27 in the plate 15 and are preferably frictionally held, passing tightly through apertures 16 (FIGS. 21 and 23) of a first sealing gasket 13 and being essentially thus hermetically sealed therein and passing therethrough and projecting therebeyond within the casing for connection with the cable 11 (FIG. 3). The first sealing gasket 13 hermetically seals the lower end of the casing and is provided with further (end) apertures 17 (FIGS. 22 and 23) through which bolt means 18 (FIGS. 7 and 8) may pass for connection with the second assembly 22 (FIG. 2) as for example, by engagement with threaded apertures 19 of plate 34 (FIG. 17a) disposed (FIG. 3) beneath a second sealing gasket 21 of the second assembly 22 (FIG. 2), means such as bolts engaging threaded apertures 62 of blade plate 42 (FIG. 16) and apertures 19' of plate 34 (FIG. 17a) to tie the assemblies together and to the casing. Means are preferably provided in the first assembly 12 to frictionally hold the elongated wire terminals 10 therein; said means may comprise spring elements 23 (FIGS. 1, 27 and 28) positioned within the plates 25, 26 having complementary opening 28' to receive the spring elements 23 and assemble the same therebetween.

The terminals 10 may be the ends of conductors or terminals secured thereto, as for example (FIG. 1) terminals 28 secured to the conductor wires 29. The latter are preferably positioned through the apertures of the first assembly in staggered relation (FIG. 1) so that when the first and second assemblies are positioned within the casing (FIG. 3) said wire terminals may engage opposite faces of the flat cable 11 and thus alternate conductors 33 therein (FIG. 10). The second assembly (FIG. 2) may comprise blade plate 34 having side walls 35, 36 one of lesser height than the other (FIGS. 17a, 17 and 3). Plate 34 (FIGS. 17, 17a) is generally rectangular and has the elongated, longitudinal opening or slot 37 therein and is adapted to be positioned beneath the second sealing gasket 21 and to receive the rib 39 thereof (FIG. 3). The second sealing gasket 21 has medial, longitudinal ribs 38, 39 and an opening 40 therethrough to tightly receive therein the flat cable 11 (FIGS. 13, 2 and 3). The blade plate 34 as noted tightly receives the lower rib 39 of the second sealing gasket 21 (FIG. 3); spring means 41 having fingers 46, 47 (FIGS. 2, 18) urge the flat cable 11 against the terminals 10 in the recesses 60 of plate 34 (FIG. 17). The spring means 41 may be secured as by rivets 48 (FIG. 3) to the blade 42 (FIG. 15) which makes up the difference in height between the walls 36 and 35. Said blade has depending therefrom the preferably staggered fingers 43, 44 (FIGS. 14–16a) adapted to have positioned therebetween the blade flat spring member 45, with alternate spring fingers 46, 47 extending therefrom (FIG. 18) preferably upwardly bowed (FIG. 3).

The flat cable 11 is positioned through the second sealing gasket 21 and around the fingers 46, 47 of the spring member; the free end 49 (FIG. 3) of the flat cable 11 being positioned against the plate wall 36 or a recess 50 therein to receive the same. Thus, when the second assembly is positioned in the casing, the free elongated wire terminal ends 10 projecting from the first assembly are thus disposed into contact with opposite faces of the flat cable 11 to complete the circuits connected to 10, 11 and the parts are hermetically closed within the casing (FIGS. 7a and 10). A cover plate 51 (FIGS. 9 and 10) may be provided having a longitudinal slot 52 therein through which the flat cable 11 passes. Said plate may be provided with cam receiving concave ends 53 (FIG. 9) for receiving the cams 54 thereon (FIGS. 9 and 7). The latter may be pivoted at an off center point 55 to the links 56 (FIG. 7) which are pivotally connected as by pins 57 to ears 58 (FIG. 5) of the casing 14. Thus, by turning the cams 54 in one direction (FIG. 7) the cover plate 51 may tighten the first and second assemblies in the casing 14; by rotating the cams in the other direction the parts may be loosened (FIG. 10 and dotted position 59 of the cam in FIG. 7) and the cams may be separated from the plate 51.

Having thus described my invention, what I claim as new and desire to secure by Letters Patent is:

1. In a device for connection of elongated wire terminals to a flat cable conductor, a hollow casing having an opening therethrough, a first assembly disposed within the lower portion of the casing, a back cover positioned on and closing the lower end of the casing, said first assembly comprising sealing gasket means proportioned for disposition on the back cover and within the casing in sealing relation thereto, wire terminal retainer means positioned on the gasket means, said back cover, sealing gasket means and retainer means having aligned apertures therein to receive the elongated wire terminals therein for extension thereabove within the casing, a second assembly for disposition within the casing over the first assembly, said second assembly comprising a flexible sealing gasket proportioned for disposition in the upper portion of the casing in sealing relation thereto, said flexible sealing gasket having a single elongated longitudinal slot therein for tightly receiving the flat cable therethrough for extension therebelow in the casing, an elongated longitudinal rib depending from the flexible gasket, a blade plate assembly disposed in the casing below the flexible gasket, said blade plate assembly having an elongated longitudinal slot for tightly receiving the dependent rib on the flexible gasket to thus assemble the flexible gasket and blade plate assembly, and means to secure said flat cable to said blade plate assembly in said opening to position said flat cable relative to said blade plate assembly when said second assembly is positioned in the casing so that the portion of the wire terminals of the first assembly are received in the longitudinal opening of said blade plate assembly and frictionally engaged against said flat cable in side-by-side relation.

2. In a device for connection of elongated wire terminals to a flat cable conductor, as set forth in claim 1, an elongated cover plate having a longitudinal opening therein, said flexible sealing gasket having a longitudinal rib at the top thereof adapted to be tightly received in and to extend into said opening of the cover plate, and complementary means on said elongated cover plate and said casing for positioning said cover plate against the top of said casing to tightly engage said second assembly against said first assembly.

3. In a device for connection of elongated wire terminals to a flat cable conductor as set forth in claim 1, spring means in said retainer means abutting said wire terminals and holding them in said assembly.

4. In a device for connection of elongated wire terminals to a flat cable conductor as set forth in claim 1, means engaging the flat cable urging said cable against the side of said plate opening to frictionally engage the extending portions of said terminals.

5. In a device for connection of elongated wire terminals to a flat cable conductor as set forth in claim 1, spring means fixed to said blade plate assembly disposed beneath the said flexible gasket and extending therefrom to urge said flat cable against the side of said blade plate assembly opening to frictionally engage the extending portions of said terminals.

6. In a device for connection of elongated wire terminals to a flat cable conductor as set forth in claim 1, said blade plate assembly so disposed beneath the flexible gasket having a pair of longitudinal walls, one of said walls being of lesser height than the other, and a blade proportioned to conform to said difference in height to be disposed on said wall of lesser height, spring means fixed to said blade and frictionally urging the flat cable against the side of said plate opening to frictionally engage the extending portions of said terminals.

7. In a device for connection of elongated wire terminals to a flat cable conductor as set forth in claim 6, said spring means comprising a flat spring member so fixed to said blade, and alternate spring fingers extending therefrom urging the flat cable against the sides of said blade plate assembly opening to frictionally engage the extending portions of said terminals.

8. In a device for connection of elongated wire terminals to a flat cable conductor as set forth in claim 2, said complementary means on said elongated cover plate and said casing being cam means movable in one direction to tighten the parts in the casing.

References Cited in the file of this patent

UNITED STATES PATENTS

| | | |
|---|---|---|
| 2,241,419 | Peters | May 13, 1941 |
| 2,552,414 | Eriksen et al. | May 8, 1951 |
| 2,698,926 | Young | Jan. 4, 1955 |
| 2,716,740 | Parish | Aug. 30, 1955 |
| 2,731,610 | Thacker | Jan. 17, 1956 |
| 2,790,153 | Arson | Apr. 23, 1957 |
| 2,903,668 | Cornell | Sept. 8, 1959 |
| 3,031,638 | Bertram et al. | Apr. 24, 1962 |
| 3,038,140 | Haberland | June 5, 1962 |
| 3,059,211 | Thomas et al. | Oct. 16, 1962 |
| 3,069,753 | Lalmond et al. | Dec. 25, 1962 |
| 3,079,579 | Crimmins et al. | Feb. 26, 1963 |

FOREIGN PATENTS

| | | |
|---|---|---|
| 231,270 | Australia | Nov. 17, 1960 |
| 798,176 | France | Mar. 2, 1936 |
| 232,334 | Great Britain | Apr. 17, 1925 |